UNITED STATES PATENT OFFICE 2,449,962

DICYCLOHEXYLAMMONIUM NITRITE AND ITS PREPARATION

Aaron Wachter and Nathan Stillman, Berkeley, Calif., assignors to Shell Development Company, San Francisco, Calif., a corporation of Delaware No Drawing. Application March 26, 1946, Serial No. 657,352

4 Claims. (Cl. 260—563)

This invention relates to a new chemical compound, namely, dicyclohexylammonium nitrite having the structural formula

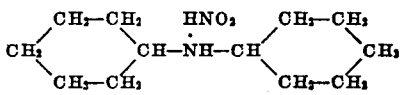

and to highly advantageous methods by which it may be manufactured.

The new compound of the invention has unique and unexpected properties which make it valuable in many industrially important applications. It may, for example, be used as a vapor phase inhibitor of corrosion, as a lubricating oil additive, as a component of plastic compositions and the like, and as an intermediate in the formation of various organic products such as synthetic medicinal compounds.

Dicyclohexylammonium nitrite is a white solid, melting with decomposition at 200° C.–201° C. and having a vapor pressure at 75° F. of 0.00016 mm. Hg. In sharp contrast to di-(methylcyclohexyl) ammonium nitrite and monocyclohexylammonium nitrite, it is a highly stable compound which undergoes substantially no decomposition during storage in dry air and may even be kept for long periods in warm humid atmospheres without serious loss. This unexpected stability compared to other ammonium nitrites gives dicyclohexylammonium nitrite great advantages in its commercial applications.

Because of its low solubility in water (3.9% at 25° C.) dicyclohexylammonium nitrite cannot be manufactured efficiently by the methods which we have found satisfactory for the production of other ammonium nitrites. Our preferred method of synthesis of the new compound of the invention is by reacting an aqueous solution of an inorganic acid salt of dicyclohexyl amine having a higher solubility in water than dicyclohexylammonium nitrite with an excess of a salt of nitrous acid and a base, which base forms with said inorganic acid a salt which is more soluble in water than dicyclohexylammonium nitrite, and recovering the dicyclohexylammonium nitrite thus produced. Suitable water-soluble dicyclohexyl amine salts are, for example, the acetate, the sulfate, etc., while suitable soluble inorganic salts of nitrous acid are, for instance, alkali metal or ammonium nitrites. Advantageously, the process may be carried out by reacting dicyclohexyl amine with a suitable acid and converting the resulting salt to the desired dicyclohexylammonium nitrite without separate isolation of the amine salt intermediate. An excess, preferably about 0.2% to 10% excess over the stoichiometric requirement, of inorganic nitrite is desirable in the final reaction. It is also important, in order to avoid side reactions leading to the conversion of dicyclohexylammonium nitrite to the nitrosoamine, that the presence of free acid in the mixture be minimized. Even when the dicyclohexyl amine salt is formed in a separate stage of reaction and the solid salt recovered and reacted with the inorganic nitrite, unless care is taken, sufficient acid may be occluded by the amine salt to cause undesirable nitrosoamine formation when the salt is brought into contact with a solution containing dicyclohexylammonium nitrite. Such occlusion of acid may be avoided by precipitating the amine salt intermediate from a dilute solution. In the preferred procedure in which separate recovery of the amine salt intermediate is omitted, the absence of undesired free acid may be insured by using a stoichiometric excess of dicyclohexyl amine in the reaction with the chosen acid and by heating the resulting reaction mixture when necessary to completely dissolve all the amine salt formed before adding the selected inorganic nitrite to the mixture. As a further aid to the elimination of undesired nitrosoamine formation, it is preferred to maintain a temperature below about 80° C. during the reaction of the dicyclohexyl amine salt with the chosen inorganic nitrite. Temperatures between about 0° C. and 60° C., preferably between about 20° C. and 50° C., are particularly advantageous. In this connection the use of sodium nitrite as the inorganic nitrite has the special advantage that it may be added in solid form so that its negative heat of solution will in part compensate for the exothermic heat of the reaction. According to this modification of the invention, efficient production of dicyclohexylammonium nitrite under conditions of accurate temperature control is achieved in a very simple manner by bringing the reaction mixture to approximately the desired reaction temperature and then adding solid sodium nitrite. The rise in temperature during reaction is usually only 1° C. to 3° C. and the dicyclohexylammonium nitrite is precipitated as formed and can be recovered directly from the aqueous solution in a sufficiently pure form for most commercial purposes.

The following example illustrates a typical method of producing the new compound of the invention according to our preferred procedure. The reactor in this case is a reaction tank of ordinary steel construction having a capacity of about 750 gallons and provided with a high speed stirrer and with a pipe coil through which steam for heating or water for cooling may be supplied as needed. Other types of reactors may, of course, be used as well as other materials of construction since it has been found that iron and copper, for example, have no deleterious effect on either the reaction or the quality of the product which is just as satisfactory as that produced in a glass reactor equipped with a stainless steel stirrer.

Example I

The reactor is charged with 276 gallons (2305 lbs.) of water in which are suspended 841 pounds of dicyclohexyl amine. While vigorously stirring, 221 pounds of concentrated sulfuric acid are rapidly run in. The heat of reaction is sufficient to raise the temperature to about 60° C. to 65° C. The acid addition is such that about 3.3% excess of amine is present on completion of the reaction, after which the mixture is heated to about 90° C. to 100° C. to dissolve completely all the dicyclohexyl amine sulfate produced. After solution is complete, the mixture is cooled to below 50° C. and 310 gallons (2679 lbs.) of mother liquor from a previous synthesis are added. The recycle mother liquor had the following composition on a weight percentage basis:

| | Per cent |
|---|---|
| Dicyclohexylammonium nitrite | 1.2 |
| Dicyclohexyl amine | 0.8 |
| Sodium nitrite | 0.2 |
| Sodium sulfate | 11.6 |
| Water | 86.2 |

After thorough mixing of the solutions, 316 pounds of solid sodium nitrite (1.53% excess over the theoretical requirement) are added and the thick mass is stirred for about 3 hours to insure complete reaction before centrifuging. The solid product from the centrifuge consists of:

| | Pounds |
|---|---|
| Dicyclohexylammonium nitrite | 1000 |
| Dicyclohexyl amine | 1 |
| Sodium sulfate | 14 |
| Water | 100 |

It may be dried without further purification to obtain a yield of dicyclohexylammonium nitrite which is approximately 95% of the theoretical. The mother liquor is divided into two parts, one of which is recycled as previously described while the remainder, of the following composition, is discarded:

| | Pounds |
|---|---|
| Dicyclohexylammonium nitrite | 31 |
| Dicyclohexyl amine | 21 |
| Sodium sulfate | 298 |
| Sodium nitrite | 5 |
| Water | 2205 |

The dry product is colorless, practically odorless and shows no signs of nitrosoamine formation. The 1.4% of sodium sulfate present in the product is not detrimental in most applications of the new compound and the 0.1% of dicyclohexyl amine which is the only other impurity present may be beneficial in some situations. However, dicyclohexylammonium nitrite containing less sodium sulfate can be readily obtained by water washing the centrifuged product before drying. Using 20% by weight of wash water, substantially all the sodium sulfate can be removed. This entails a loss of approximately 0.75% of the solid dicyclohexylammonium nitrite product in the wash water but this can be reduced by recycling the washings in place of a corresponding part of the mother liquor.

The pure dicyclohexylammonium nitrite exists as colorless needles melting with decomposition at 200° C.–201° C. and analyzing as follows:

| | Water Per Cent | | | |
|---|---|---|---|---|
| | C | H | N | O |
| Calculated for $C_{12}H_{24}N_2O_2$ | 63.1 | 10.59 | 12.28 | 14.03 |
| Found | 63.2 | 10.64 | 12.2 | [1] 14.0 |
| | 63.1 | 10.56 | 12.3 | 14.0 |

[1] By difference.

The new compound is highly stable even in a warm humid atmosphere compared with other ammonium nitrites having a cyclohexyl radical in the molecule as shown by the following tests:

Crystals (0.05 g.) of the ammonium nitrites being tested were accurately weighed into small Pyrex glass tubes which were placed into larger (15 by 125 mm.) test tubes. A few drops of water were added outside the small tube containing the crystals to insure a moisture-saturated atmosphere and the larger test tubes were flame-sealed rapidly. The tubes were maintained at 150° F. for various periods, after which duplicate tubes were opened and the contents analyzed for nitrite colorimetrically from which the per cent of original ammonium nitrite remaining was calculated. The results are tabulated below:

| Compound | Per Cent Remaining After— | |
|---|---|---|
| | 50 hours | 1,000 hours |
| Dicyclohexylammonium nitrite | 100 | 95 |
| Di-(p-methylcyclohexyl) ammonium nitrite [1] | 1.3 | |
| Monocyclohexylammonium nitrite | 59 | |

[1] After 25 hours only 14.0% of this compound remained undecomposed.

This remarkable and unexpected stability under adverse conditions greatly facilitates industrial application of dicyclohexylammonium nitrite where the other compounds are unsuitable. Even in dry storage under the foregoing conditions, dicyclohexylammonium nitrite shows a marked superiority to the other ammonium nitrites. For example, di-(p-methylcyclohexyl)-ammonium nitrite loses 4% of its weight in 50 hours of storage at 150° F., while dicyclohexylammonium nitrite is entirely unchanged after 500 hours.

Dicyclohexylammonium nitrite has a wide range of solubility in different solvents, as shown by the following results of determinations made at 25° C.:

| Solvent | Grams of Dicyclohexylammonium Nitrite per 100 grams of Saturated Solutions |
|---|---|
| Methyl alcohol | 23.6, 22.2 |
| Ethyl alcohol | 9.2 |
| Dioxane | 7.9 |
| Ethylene glycol | 5.6 |
| Methyl Cellosolve | 4.3 |
| Water | 4.0 |
| Carbitol | 3.4 |
| Butyl Cellosolve | 2.6 |
| Isopropyl alcohol | 2.2 |
| Carbon tetrachloride | 0.01 |
| Acetone | 0.23 |
| Trichloroethylene | 0.11 |
| Ethyl acetate | 0.06 |
| Methyl isobutyl ketone | <0.05 |
| Methyl ethyl ketone | <0.05 |
| Isopropyl ether | <0.05 |
| Dicyclohexyl amine | <0.05 |
| Toluene | <0.05 |
| Isopentane | <0.05 |
| Isooctane | <0.05 |
| Sulfolane | Quite Low |

The effect of temperature on the solubility of dicyclohexylammonium nitrite in water, methyl alcohol and a mixture of equal parts by weight of water and ethylene glycol is shown in the following table:

| Temperature | Grams of Dicyclohexylammonium Nitrite per 100 Grams of Saturated Solution in— | | |
|---|---|---|---|
| | Water | Methyl Alcohol | Mixture of 50 wt. per cent water and 50 wt. per cent ethylene glycol |
| 0° C | 3.0 | 14.5-14.8 | 4.3 |
| 25° C | 4.0 | 22.2-23.6 | 4.5 |
| 45° C | 5.2 | 34.7 | 6.8 |
| 65° C | 6.9 | | |

In methanol-water and ethylene glycol mixtures, the solubility of dicyclohexylammonium nitrite varies with the solvent composition as follows:

| Weight Per Cent Water in Solvent Mixture | Grams of Dicyclohexylammonium Nitrite per 100 Grams of Saturated Solution at 25° C. in— | |
|---|---|---|
| | Methanol-Water Mixture | Ethylene Glycol-Water Mixture |
| 75 | 6.8 | 4.1 |
| 50 | 13.5 | 4.5 |
| 25 | 21.1-22.5 | 5.5 |

As previously mentioned, the unique combination of properties possessed by the new compound of the invention makes it particularly valuable as a corrosion inhibitor. Thus, for example, its solutions in ethylene glycol-water mixtures are useful as corrosion inhibiting hydraulic fluids. Its vapor pressure in combination with its corrosion inhibiting properties and unusual stability make it ideally suited for the protection of metal articles during shipment. All that is necessary to obtain complete protection of steel machine parts, for instance, is to place a small amount of dicyclohexylammonium nitrite in the package which need not be water vapor-proof. Outstanding results have been obtained by impregnating paper and cardboard with solutions of dicyclohexylammonium nitrite in methanol-water mixtures and, after removal of the solvent, using the resulting products for corrosion-proof packaging. The excellent protection afforded by the new compound of the invention is shown by the following tests in which specimens of boiler plate steel and electrolytic copper were suspended in glass stoppered bottles above 0.5 gm. of water and a mixture of 0.5 gm. of dicyclohexylammonium nitrite and 0.5 gm. of water and kept for 7 days at 150° F.

| Inhibitor | Gain in Weight of Metal Mgs., Steel | Appearance of Metal (Steel) |
|---|---|---|
| None | 102.2 | Badly rusted all over. |
| Dicyclohexylammonium Nitrite | 10.1 | Only 6 or 7 very small rust spots. |
| Bis 3,3,5-trimethylcyclohexylammonium Nitrite | 16.9 | 40% to 50% of surface rusted. |
| N-isopropylcyclohexylammonium Nitrite | 33.7 | More than 50% of surface rusted. |

Polished strips of electrolytic copper and of brass (70% copper-30% zinc) were likewise adequately protected from corrosion in partial immersion tests at 86° F. for 14 days with aeration every two days, the loss in weight of the copper being very low while that of the brass was at the rate of only 0.14 mil per year. Dicyclohexylammonium nitrite is greatly superior as a vapor phase inhibitor of corrosion of steel to di-(methylcyclohexyl)ammonium nitrite, for example. With the former, complete protection is provided for over 5 months' storage at 120° F. in a saturated atmosphere by wrapping paper containing only 1 gram of dicyclohexylammonium nitrite per square foot, while with the latter extreme corrosion takes place in less than a month. Dicyclohexylammonium nitrite also has a protecting effect on aluminum and does not tarnish nickel or chrome plate or monel. It can be used to prevent the tarnishing of silver in hydrogen sulfide-containing atmospheres. Other uses in which the new compound of the invention has proved advantageous include its application as a corrosion inhibitor in fluids containing water and as a component of protective coatings for metals.

The advantageous properties of the new compound of the invention make it suitable for many other applications. It may be used, for example, to prepare a wide variety of valuable derivatives. Thus, for example, by treatment with dilute acid and a mild reducing agent, it is converted to dicyclohexylhydrazine

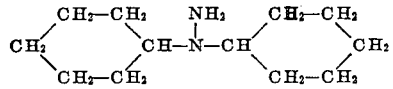

By reaction with acid dicyclohexylammonium nitrite is converted to dicyclohexylnitrosoamine which is a useful intermediate in the preparation of organic dyestuffs and the like. Still other derivatives of the new compound of the invention may be produced, and it may be applied to other advantageous uses.

While the preparation of dicyclohexylammonium nitrite from dicyclohexyl amine sulfate has been emphasized in Example I, it will be understood that other methods of manufacture may also be employed. Also, other conditions of reaction may be used when employing the same starting materials, as shown by the following results:

Example II

Dicyclohexyl amine was suspended in water, aqueous sulfuric acid was added and the reaction mixture treated with sodium nitrite. The precipitated dicyclohexylammonium nitrite was recovered by filtration, purified by washing with methyl or isopropyl alcohol, and dried. The reaction conditions and results are given in the following table:

| Weight of Initial charge, g. | | Acid Added, g. | | NaNO₃, g. | Temp., °C. | Solid Dicyclohexylammonium Nitrite Recovered | | Yield of Dicyclohexylammonium Nitrite, Percent | | | |
|---|---|---|---|---|---|---|---|---|---|---|---|
| Dicyclohexyl Amine | Water | H₂SO₄ (100%) | Water | | | Wt., g. | Wt. percent Dicyclohexyl-ammonium Nitrite | Solid | Filtrate | Washings | Total |
| 453 | 1500 | 117 | 500 | 169 | 51-50 | 550 | 80.7 | 81.8 | 17.5 | 6.7 | 106.0 |
| 544 | 1500 | 140 | 600 | 203 | 49-50 | 522 | 97.1 | 78.2 | 10.6 | 4.5 | 93.3 |
| 725 | 2000 | 186 | 792 | 270 | 31-30 | 676 | 99.6 | 78.0 | 9.85 | 4.8 | 92.7 |

Example III 25 g. of concentrated 96% sulfuric acid were slowly added to an aqueous solution of 90.7 gm. of dicyclohexyl amine in 69 cc. of water, and about an equivalent amount of sodium nitrite (34.5 g. in 72 cc. water) was then added while the pH of the solution was kept above 7 throughout the additions. After completion of the reaction and removal of precipitated sodium sulfate, the mixture was diluted to about 10 times (i. e. 3500 cc.) its original volume with acetone, thereby forming a solution of the cyclohexyl amine nitrite salt and a precipitate of acetone-insoluble inorganic salts such as sodium sulfate and sodium nitrite. After filtration of the insoluble salts the acetone solution may be evaporated to recover the organic nitrite salt, which may be further purified by recrystallization from a suitable solvent (i. e. isopropyl alcohol). The dicyclohexylammonium nitrite obtained sublimed at about 130° C. to 140° C. and was soluble in organic solvents such as benzene as well as in water. Its solutions in water and in organic solvents were quite stable.

Successful results have also been obtained with other starting materials in the process, as shown by the following examples:

Example IV

Dicyclohexyl amine was neutralized with about 95% of the theoretical amount of acetic acid using a dilute reaction mixture (approximately one liter of water per gram mole of the amine). The resulting dicyclohexyl amine acetate was precipitated from the reaction mixture with n-pentane, and 224 grams of the solid salt in 700 cc. of water were treated at 25° C. with 63 grams of sodium nitrite. On filtration of the reaction mixture, 142 grams of dicyclohexylammonium nitrite were recovered, representing a yield of 67% of the theoretical. It was found feasible to recycle as much as 90% of the mother liquor from the reaction, thus substantially increasing the yield.

Example V

An acetone solution of dicyclohexyl amine was treated with dry hydrogen chloride gas at about 20° C. The resulting dicyclohexyl amine hydrochloride is then reacted with silver nitrite, freshly prepared from silver nitrate and sodium nitrite and dried with acetone. Although both reactants are but slightly soluble in acetone, due to the extremely low solubility of silver chloride in acetone, the reaction goes to substantial completion at room temperature in about one hour, yielding an acetone solution of dicyclohexylammonium nitrite and a silver chloride precipitate which may be removed by filtration. The dicyclohexylammonium nitrite is recovered by evaporation of the acetone solution and is obtained in a very pure form by recrystallization from methyl or isopropyl alcohol.

Still other methods of producing the new compound of the invention may be used (for instance, nitrous acid gas may be passed through an oil containing dicyclohexyl amine in solution); hence, it will be understood that the invention is not to be limited to the procedures given by way of illustration nor by any theory proposed in explanation of the improved results which are obtained.

This application is a continuation-in-part of copending application Serial No. 492,640, filed June 28, 1943, U. S. Patent 2,419,327, and is also a continuation-in-part of copending application Serial No. 525,322, filed March 6, 1944, now abandoned, which is a continuation-in-part of said application Serial No. 492,640 and of application Serial No. 492,641, also filed June 28, 1943, now abandoned.

We claim as our invention:

1. Dicyclohexylammonium nitrite having the structural formula

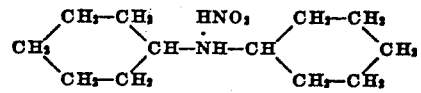

2. A method of producing dicyclohexylammonium nitrite which comprises reacting in the absence of free acid an aqueous solution of an inorganic acid salt of dicyclohexyl amine having a higher solubility in water than dicyclohexylammonium nitrite with an excess of a salt of nitrous acid and a base, which base forms with said inorganic acid a salt which is more soluble in water than dicyclohexylammonium nitrite, maintaining the pH of the solution above 7 throughout the reaction, and recovering the resulting dicyclohexylammonium nitrite.

3. A method of producing dicyclohexylammonium nitrite which comprises adding in the absence of free acid a stoichiometric excess of sodium nitrite in the solid state to an aqueous solution of dicyclohexyl amine sulfate maintained at a pH about 7 and at a temperature of about 20° C. to about 50° C.

4. A method of producing dicyclohexylammonium nitrite which comprises reacting in aqueous solution a stoichiometric excess of dicyclohexyl amine with sulfuric acid, controlling the proportions of the reactants and water and the temperature so as to insure the complete solution of the dicyclohexyl amine sulfate formed, adding to the solution containing dicyclohexyl amine sulfate and free dicyclohexyl amine at between 0° C. and about 50° C. from 0.2% to 10% excess of solid sodium nitrite over the stoichiometric requirement for reaction with the dicyclohexyl amine sulfate present at a rate regulated so that any rise in temperature during the reaction is not more than 3° C., separating the diclohexylammonium nitrite precipitated and returning the remaining solution to the dicyclohexyl amine-sulfuric acid reaction.

AARON WACHTER.
NATHAN STILLMAN.

REFERENCES CITED

The following references are of record in the file of this patent:

UNITED STATES PATENTS

| Number | Name | Date |
| --- | --- | --- |
| 2,419,327 | Wachter et al. | Apr. 22, 1947 |

OTHER REFERENCES

Wallach et al., "Liebigs Annalen," volume 346 (1906), pages 264–265.

Fougue, "Annales de Chimie," volume 15 (1921), 9th series, page 305 and page 314.